United States Patent Office 2,997,488
Patented Aug. 22, 1961

2,997,488
2-METHYL-19-NOR-STEROIDS
Hendrik Paul de Jongh, Oss, Netherlands, assignor to Organon Inc., West Orange, N.J., a corporation of New Jersey
No Drawing. Filed June 14, 1960, Ser. No. 35,892
Claims priority, application Netherlands June 20, 1959
3 Claims. (Cl. 260—397.5)

The invention relates to a process for the preparation of 19-nor-steroids non-oxygenated in 3-position.

More particularly it relates to the new steroids of the general formula:

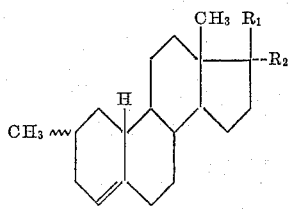

in which:
$R_1$ = a hydroxyl or an acyloxy group,
$R_2$ = hydrogen or a saturated or unsaturated aliphatic hydrocarbon group with 1–4 carbon atoms, or
$R_1$ and $R_2$ = together a keto group.

The present compounds possess very valuable biological activities. For instance the 17-hydroxy-17-saturated alkyl-compounds have strong anabolic and low androgenic activities, being particularly active when given orally. A great advantage of the mentioned compounds is that they exert no progestational activity.

The compounds according to the invention can be prepared starting from the corresponding 3-keto-steroids, splitting off the 3-keto-group of a $\Delta^4$-3-keto-2-methyl-19-nor-androstene compound, substituted in 17-position by a hydroxyl or acyloxy group and a hydrogen atom, or by a hydroxyl or acyloxy group and an aliphatic hydrocarbon radical, and, if required, by introducing before or after this splitting off, by methods known per se, the substituents stated in the formula in 17-position.

The $\Delta^4$-3-keto-2-methyl-19-nor-androstene compounds to be used as starting products in the present process can be prepared from the corresponding compounds non-methylated in 2-position by methods known per se, for example, as described by J. A. Hogg et al. in J. Am. Chem. Soc. vol. 77, page 4436 and page 6401 (1955), by condensing them with an alkyl ester of a lower aliphatic mono- or dicarboxylic acid in the presence of a strong base to obtain the corresponding 2-acyl compound, by treating them then with a methyl halogenide by which an alkyl group is introduced into 2-position, after which the 2-acyl group is split off the thus obtained compound, so that the corresponding 2-methyl compound is obtained. In the preparation of the present starting products a number of new biologically active compounds are also obtained, however, including steroid compounds of the general formula:

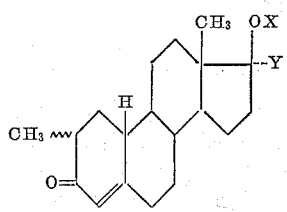

in which:
X = hydrogen or an acyl group,
Y = a saturated or unsaturated aliphatic hydrocarbon group with 2–4 carbon atoms.

The 3-keto group may be split off in different manners. It is possible, for example, to convert the 3-keto compound into a 3-thioketal by one of the known methods and then split off the 3-thioketal by reaction of this compound with an alkali metal in the presence of liquid ammonia.

The thioketalisation of the 3-keto group can take place by condensation of the 3-keto-steroid with a thiol or dithiol in the presence of zinc chloride or hydrochloric acid and a dehydrating agent, such as sodium sulfate.

It is also possible to prepare the desired 3-thioketals by an exchange reaction or by reaction with a thiol or di-thiol in the presence of p-toluene sulfonic acid and an in water insoluble organic solvent. The water formed during the reaction is removed. Another possibility is that the 3-keto-steroid, preferably dissolved in methanol, is reacted with the relative SH-compound in the presence of a Lewis-acid, preferably boron trifluoride etherate.

A summary of the well-known thioketalisation reactions is given by L. F. Fieser in J. Am. Chem. Soc. 76, pages 1945–1947 (1954).

The 3-keto group is preferably converted into a cyclic thioketal, for example, by means of ethane/dithiol, propane dithiol or butane dithiol, but also non-cyclic thioketals, for example, those derived from ethyl thiol, propyl thiol, thiophenol or benzyl thiol, may be used in the present process as intermediate products.

The thus prepared $\Delta^4$-2-methyl-19-nor-3-thioketal-steroid is then reacted with an alkali metal in the presence of liquid ammonia, when the 3-thioketal-steroid is reduced and a $\Delta^4$-19-nor-steroid compound non-oxygenated in 3-position is obtained. Said reduction is usually carried out in the presence of a suitable solvent, such as an aliphatic ether, dioxane or tetra hydrofuran.

The alkali metal used in this reaction may be, for example, lithium, sodium or potassium. Preferably sodium is used.

The 3-keto group may also be split off by one of the methods described in the Netherlands Patents No. 91,082 and No. 91,086. These processes are characterized in that the $\Delta^4$-3-keto-steroid is reduced to the corresponding 3-hydroxy compound, which group is then etherified or esterified, after which the etherified or esterified hydroxyl group present in 3-position is split off.

The reduction of the 3-keto group may be carried out by means of one of the usual reducing agents, such as an alkali metal borohydride, an alkali metal aluminium hydride, an alkali metal trialkoxy borohydride or aluminium isopropoxide in isopropanol.

The etherification or esterification of the 3-hydroxyl group following hereafter may be carried out in any known manner.

The 3-substituent is split off by reacting the compound in question with an alkali metal in the presence of liquid ammonia or an aliphatic primary amine. This reaction is usually carried out in the presence of a suitable solvent, such as an aliphatic ether, dioxane or tetra hydrofuran.

The 3-substituent is preferably split off by converting it into a 3-thioketal group and by splitting this off by reacting the 3-thioketal steroid with an alkali metal in the presence of liquid ammonia.

The steroid compounds to be used as starting products in splitting off the 3-keto group may already have been substituted in 17-position by a hydroxyl group and a hydrogen atom, or by a hydroxyl group and an aliphatic hydrocarbon group with 1–4 carbon atoms. This hydrocarbon group may be saturated or contain one or two double bonds. If the hydrocarbon group contains a triple bond, this will also be reduced in the reduction methods described above. In order to obtain an in 3-position non-oxygenated steroid compound, substituted in 17-position by a triple unsaturated hydrocarbon group, such as an ethinyl or butynyl group it will therefore be necessary to introduce this group after splitting off the 3-substituent.

It is also possible to introduce the saturated or double unsaturated hydrocarbon group present in the desired final products in 17-position after splitting off the 3-substituent, for example, by starting from the $\Delta^4$-3-keto-2-methyl-17-hydroxy-19-nor-androstene, splitting the 3-keto group off this compound by means of one of the processes described above, subsequently oxidizing the 17-hydroxy group into a keto group and finally by converting this compound into the desired 17-alkyl-derivative by an alkylating reaction.

The saturated or unsaturated aliphatic hydrocarbon group present in the final products in 17-position is for example a methyl-, ethyl-, propyl-, isopropyl-, butyl-, vinyl-, propenyl-, allyl-, methallyl-, ethinyl-, propynyl- or butynyl group.

According to the present process there are obtained the $2\alpha$-, and $2\beta$-methyl-compounds. Principally the $2\alpha$-methyl-steroids are obtained which have the most valuable biological properties.

If desired, the 17-hydroxy steroids prepared in accordance with the processes described above may be esterified with a saturated or unsaturated carboxylic acid, in which particularly the acids with long carbon chains are of importance to obtain esters with prolonged action. Preferably carboxylic acids with 1–30 carbon atoms are used.

As examples of acids to be used are mentioned: formic acid, acetic acid, propionic acid, butyric acid, valeric acid, caproic acid, caprylic acid, capric acid, undecylic acid, lauric acid, tridecylic acid, myristic acid, pentadecylic acid, oleic acid, palmitic acid, stearic acid, arachic acid, behenic acid, lignoceric acid, cerotic acid, mentanic acid, myricinic acid, trimethyl acetic acid, diethyl acetic acid, hexahydrobenzoic acid, cyclopentyl propionic acid, cyclohexyl propionic acid, cyclohexyl butyric acid, citronelic acid, undecylenic acid, erucic acid, benzoic acid, phenyl acetic acid, phenyl propionic acid, phenyl butyric acid, phenyl propiolic acid, succinic acid, glutaric acid, pimelic acid, tartaric acid, carbamic acid, glycine and alanine.

The preparation of these esters can take place by any method known per se by reacting the 17-hydroxy steroid with the acid in question, or the anhydride or the halogenide thereof.

When a steroid compound substituted in 17-position by a hydroxyl group and a hydrogen atom has been taken as starting material, this compound may after the 3-keto group has been split off be oxidized into the corresponding 17-keto compound by one of the usual methods. This compound possesses as such biological activity, but may also be used for the preparation of the corresponding 17-hydroxy-17-alkyl-steroids.

The following examples illustrate the invention.

*Example I*

To a solution of 11.5 g. of 17$\alpha$-methyl-19-nor-testosterone in 200 ml. of t-butanol and 12 ml. of ethyl oxalate a solution of 1.4 g. of sodium in 50 ml. of methanol is added. The reaction mixture is stirred at room temperature for 6 hours, after which 1 l. of absolute ether is added. The mixture is then left overnight, after which the precipitate formed is sucked off, washed with ether and dried. The thus obtained product is dissolved in 400 ml. of water, after which the solution is acidified with 2 N HCl. The precipitate is sucked off, washed with water until neutral and dried. There is obtained 12.2 g. of 17$\alpha$-methyl-19-nor-testosterone-2-ethyl-oxalate; melting point 150–152° C. (decomposition). The product obtained is dissolved in 150 ml. of acetone, after which 15 ml. of methyliodide and 10 g. potassium carbonate are added. The mixture is refluxed for 40 hours. In the middle of this period another 15 ml. of methyliodide are added. The reaction mixture is then evaporated in vacuo, to the residue water is added and the aqueous mixture is extracted with methylene chloride. The organic layer is separated, washed with 1% sodium hydroxide solution in water, then with water until neutral, dried and finally evaporated to dryness in vacuo. Yield: 11.7 g. of the 2,17-dimethyl-19-nor-testosterone-2-ethyl-oxalate.

This product is dissolved in 125 ml. of absolute alcohol, in which beforehand 1.25 g. of sodium has been dissolved, after which the solution is kept at room temperature for 24 hours. Then the solution is diluted with 500 ml. of water and after that extracted with methylene chloride. The organic layer is separated, washed with water until neutral, dried and evaporated in vacuo. Yield: 9.5 g. of crude 2,17$\alpha$-dimethyl-19-nor-testosterone. This crude substance is chromatographed over 300 g. of silicagel when the fractions eluted with benzene-ether 4:1 are collected and evaporated, after which the residue is crystallized from ether. Yield: 5 g. of pure 2,17$\alpha$-dimethyl-1-19-nor-testosterone; melting-point 114–115° C. and $[\alpha]_D^{26} = +35°$ (chloroform).

2 g. of 2,17$\alpha$-dimethyl-19-nor-testosterone are dissolved in 9 ml. of methanol. The solution is cooled to $-10°$ C., after which 1 ml. of ethanedithiol and 0.65 ml. of boron trifluoride etherate are added. The reaction mixture is left at 0° C. for 4 hours, after which 0.5 ml. of water is added. The mixture is then left again overnight at 0° C., after that 30 ml. of ice-water are added and finally the mixture is kept at 0° C. for 2 hours. The precipitate formed is sucked off, washed with water until neutral and dried. Yield: 2.51 g. of 2,17-dimethyl-19-nor-testosterone-3-thioketal; melting-point 78–85° C. A solution of this compound in 15 ml. tetrahydrofuran is added with stirring to a solution of 1.24 g. of sodium in 75 ml. of liquid ammonia. The mixture is stirred for 15 minutes and after that 7 ml. of absolute methanol are added. The ammonia is evaporated, 120 ml. of water are added, the water layer is separated, extracted with benzene, the benzene extract is washed, dried and evaporated to dryness, after which the residue is chromatographed over 50 g. of silicagel. As elution agent a mixture of benzene and ether (95:5) is used. After crystallisation from petroleum ether the $\Delta^4$-2,17$\alpha$-dimethyl-17$\beta$-hydroxy-19-nor-androstene is obtained; melting-point 127° C.

To a solution of 2.1 g. of $\Delta^4$-2,17$\alpha$-dimethyl-17$\beta$-hydroxy-19-nor-androstene in 15 ml. of pyridine 3.9 g. of acetic acid anhydride are added. The solution is stirred at 35° C. for 8 hours, after which 25 ml. of water are added. The mixture is then stirred for 2 hours and next, after adding 100 ml. of water, extracted with ether. The ether-extract is washed with 2 N hydrochloric acid, after that with 1 N sodium hydroxide, subsequently dried with sodium sulfate and finally evaporated to dryness. The residue is recrystallised from methanol, after which the 17-acetate of the $\Delta^4$-2,17$\alpha$-dimethyl-17$\beta$-hydroxy-19-nor-androstene is obtained.

Analogously the valerianate, trimethyl acetate, caproate, succinate and $\beta$-phenyl propionate are prepared by replacing the acetic acid anhydride used for this purpose by an equivalent quantity of the acid anhydride in question.

*Example II*

To a solution of 3 g. of 19-nor-testosterone in 50 ml. of t-butanol and 3 ml. of ethyloxalate a solution of 0.4 g. of sodium in 13 ml. of methanol is added. The reaction mixture is stirred at room temperature for 6 hours, after which 250 ml. of absolute ether are added. The mixture is left overnight, after which the precipitate formed is sucked off, washed with ether and dried. The sodium salt of the enolate obtained is dissolved in 50 ml. of water, after which the solution is acidified with 2 N HCl. The precipitate is sucked off, washed with water until neutral and dried. This is dissolved in 40 ml. of acetone, after which 4 ml. of methyl iodide and 2.5 g. of $K_2CO_3$ are added. The mixture is refluxed for 40 hours. After about 20 hours another 4 ml. of methyl iodide are added.

The reaction mixture is then evaporated in vacuo.

After water has been added to the residue, the aqueous mixture is extracted with chloroform.

The organic layer is separated, washed with 1% NaOH-solution in water, then with water until neutral.

The solution is evaporated to dryness in vacuo. Yield: 3 g. of 2-methyl-19-nor-testosterone-2-ethyl-oxalate.

This product is dissolved in 30 ml. of absolute ethanol, in which beforehand 0.3 g. of sodium has been dissolved. The solution is kept at room temperature for 24 hours. The solution is then diluted with 500 ml. of water and after that extracted with chloroform.

The chloroform extracts are washed with water until neutral and evaporated in vacuo.

Yield: 2.3 g. of crude 2-methyl-19-nor-testosterone. The crude substance is chromatographed over 75 g. of silicagel with benzene/ether. Thus pure 2-methyl-19-nor-testosterone is obtained.

Of this substance 1.1 g. are dissolved in 45 ml. of methanol, after which to this solution 0.55 g. of $NaBH_4$ at room temperature is added. After standing 20 minutes the reaction mixture is neutralized with glacial acetic acid and after that evaporated in vacuo to a volume of 5 ml. The residue is poured into 80 ml. of water, after which the $\Delta^4$-3,17-dihydroxy-2-methyl-19-nor-androstene crystallizes.

The sucked off crystals are dissolved in 25 ml. of methanol, after which to this solution 0.6 ml. of 36% hydrochloric acid is added. The solution obtained is stirred at room temperature for one hour, after which the reaction mixture is neutralized with sodium bicarbonate and evaporated to 5 ml. The residue is poured into 45 ml. of water, after which the herein obtained crystals of $\Delta^4$-3-methoxy-17-hydroxy-2-methyl-19-nor-androstene are sucked off and recrystallized from acetone.

Of this compound 1 g. is dissolved in 15 ml. of dry ether, after which to this solution a solution of 1 g. of lithium in 45 g. of ethylamine is added dropwise. After stirring 10 minutes the excess of lithium is removed by gently adding 10 ml. of methanol to the reaction mixture. The ethylamine is then evaporated in vacuo, the residue is taken up in ice water, after which the mixture is extracted a few times with ether. The collected ether extracts are washed, after which the ether is evaporated in vacuo. The drying residue is recrystallized from petroleum ether to obtain the $\Delta^4$-17$\beta$-hydroxy-2-methyl-19-nor-androstene.

To a solution of 1 g. of this compound in 10 ml. of pyridine 2 ml. of capric chloride is added while stirring. The reaction mixture is left overnight at room temperature, then 20 ml. of water are added and the solution is stirred for 2 hours. After adding 100 ml. of water the mixture is extracted with ether. The ether extract is washed with 2 N hydrochloric acid, after this with 1 N sodium hydroxide, then dried with sodium sulfate and finally evaporated to dryness. The residue obtained is taken up in benzene-petroleum ether (1:1) and then filtered over 40 g. of aluminium oxide. The eluate is evaporated to dryness and the drying residue recrystallized from methanol to obtain the 17-caprinate (-decanoate) of the $\Delta^4$-17$\beta$-hydroxy-2-methyl-19-nor-androstene.

Analogously the 17-undecylate, the 17-laurate, the 17-oleate and the 17-cerotinate are prepared.

Example III

Of the 2-methyl-19-nor-testosterone prepared in accordance with Example II 1 g. is dissolved in 22 ml. of glacial acetic acid, after which a solution of 800 mg. of chromium trioxide in 2 ml. of water and 8 ml. of glacial acetic acid is added to this solution at room temperature. The reaction mixture is left for 5 hours at room temperature, after which it is diluted wtih 500 ml. of water and extracted with chloroform. The chloroform extracts are washed with a diluted sulfuric acid solution, a sodium carbonate solution, then with water and finally dried with sodium sulfate. The solution is evaporated to dryness, after which the residue is recrystallized from a mixture of acetone and petroleum ether to obtain the $\Delta^4$-3,17-diketo-2-methyl-19-nor-androstene.

Of this compound 1.2 g. are dissolved in 8 ml. of absolute dioxane, after which to this solution 1.25 ml. of ethyl orthoformate and 0.75 ml. of a solution consisting of 120 mg. of p-toluene-sulfonic acid, 5.5 ml. of dioxane and 1.1 ml. of absolute ethanol, are added. During stirring the reaction mixture is kept at room temperature for 3 hours, after which 1.5 ml. of pyridine are added. The mixture is after that evaporated to dryness, after which the residue is recrystallized from a mixture of petroleum ether and ether to obtain the 3-enol-ethyl-ether of the $\Delta^4$-3,17-diketo-2-methyl-19-nor-androstene.

To a solution of 1 g. of this compound in 25 ml. of dioxane a solution of potassium isopropylate in dioxane cooled to 0° C. is added with stirring in nitrogen atmosphere. Last-mentioned solution is prepared by adding 2.5 g. of potassium to 22 ml. of absolute isopropanol, followed by adding 10 ml. of dioxane. The nitrogen stream is replaced by a stream of acetylene gas. After leading the acetylene gas through the solution for 2 hours, the reaction mixture is poured into 350 ml. of acidified ice water. The remaining solution is extracted with ether. The separated ether layer is washed with a sodium carbonate solution, diluted with sulfuric acid and with water. The ether layer is after that dried on sodium sulfate and after that evaporated to dryness. The residue is recrystallized from acetone to obtain the $\Delta^4$-2-methyl-3-keto-17$\alpha$-ethynyl-17$\beta$-hydroxy-nor-androstene.

This compound is converted, in the manners described in the Examples I and II, into the corresponding 17-esters derived from $\beta$-phenyl propionic acid, myristic acid, caprylic acid, $\gamma$-cyclohexyl butyric acid, cerotic acid and lignoceric acid.

To a solution of 0.8 g. of $\Delta^4$-2-methyl-3-keto-17$\alpha$-ethynyl-17$\beta$-hydroxy-19-nor-androstene in 60 ml. of ethanol 100 g. of Pd-Ba $SO_4$ (5%)-catalyst are added. The solution is shaken in hydrogen atmosphere until 0.003 mol. nitrogen is taken up. The catalyst is then filtered off and the filtrate evaporated to dryness in vacuo. The residue is recrystallized from acetonitrile to obtain the $\Delta^4$-2-methyl-3-keto-17$\alpha$-vinyl-17$\beta$-hydroxy-19-nor-androstene.

This compound is converted into the $\Delta^4$-2-methyl-17$\alpha$-vinyl-17$\beta$-hydroxy-19-nor-androstene in the manner stated in Example I.

By esterification of this compound in the manner described in the above examples the 17-esters thereof are derived from trimethyl acetic acid, $\beta$-phenyl propionic acid, caprylic acid and behenic acid.

Example IV

To 5 g. of 17-ethyl-19-nor-testosterone, dissolved in 100 ml. of t-butanol and 6 ml. of ethyloxalate, a solution of 0.8 g. of sodium in 25 ml. of absolute methanol is added. The solution is stirred at room temperature for 6 hours, after which 500 ml. of absolute ether are added. The mixture is kept one night at room temperature, after which the precipitate formed is sucked off. The precipitate is washed with ether and dried.

This crude product is dissolved in 200 ml. of water and next precipitated by acidification with 2 N HCl.

After suction off and washing until neutral with water 5.6 g. of 17$\alpha$-ethyl-19-nor-testosterone-2-ethyloxalate are obtained. This compound is dissolved in a solution of 75 ml. of acetone, 7.5 ml. of methyliodide and 5 g. of potassium carbonate, after which the mixture is refluxed for 40 hours to which after 20 hours another 7.5 ml. of methyliodide are added. The reaction mixture is subsequently evaporated in vacuo. After adding water to the residue, the aqueous mixture is extracted with chloroform. The chloroform layers are washed with 1% NaOH solution in water and next with water until neutral. After the chloroform solution has been dried with Na₂SO₄ it is evaporated to dryness in vacuo.

There is obtained 5.3 g. of 2-methyl-17α-ethyl-19-nor-testosterone-2-ethyloxalate.

This compound is dissolved in 60 ml. of absolute alcohol, in which 0.6 g. sodium is dissolved.

This solution is kept at room temperature for 24 hours, after which subsequently 250 ml. of water are added. After extraction with chloroform, and washing the chloroform extracts with water until neutral, these extracts are dried and evaporated to dryness in vacuo.

The crude substance is chromatographed over 150 g. of silicagel and eluted with benzene-ether.

The main fraction is crystallized from a mixture of ether and petroleum ether, to obtain 2 g. of 2-methyl-17α-ethyl-19-nor-testosterone.

Of this compound 1.5 g. are dissolved in 8 ml. of methanol, after which this solution is cooled to −10° C. Then 0.75 ml. of ethanedithiol and 0.5 ml. of boron trifluoride etherate are added, after which the reaction mixture is kept at 0° C. for 4 hours. Then 0.5 ml. of water is added and the solution is kept at 0° C. for one night. After adding 25 ml. of ice-water to the reaction mixture it is left standing for 2 hours at 0° C., after which the precipitate formed is sucked off, washed with water and dried to obtain 2 g. of the 2-methyl-17α-ethyl-19-nor-testosterone-3-thioketal.

A solution of said compound in 10 ml. of tetrahydrofuran is added with stirring to a solution of 1 g. of sodium in 50 ml. of liquid ammonia. The mixture is stirred for 15 minutes and then 7 ml. of ethanol are added. The ammonia is evaporated and 120 ml. of water are added, after which the aqueous mixture is extracted with benzene. The benzene extracts are washed, dried and evaporated to dryness in vacuo, to obtain the crude Δ⁴-2-methyl-17α-ethyl-17β-hydroxy-19-nor-androstene.

Chromatography over 50 g. of silicagel gives after elution with a mixture of benzene and ether the pure product.

Example V

A solution of 13.2 g. of chromium trioxide in a mixture of 120 ml. of water and 20 ml. of acetic acid is added, with stirring to a solution of 20 g. of Δ⁴-17β-hydroxy-2-methyl-19-nor-androstene (prepared in Example II).

Subsequently the mixture is stirred at room temperature for 16 hours, after which the benzene layer is extracted a few times with benzene and the collected benzene extracts are then added to the separated benzene layer. The collected benzene extracts are successively washed with dilute sulphuric acid and water and then evaporated to dryness. The residue is crystallized from acetone/hexane to obtain the Δ⁴-17-keto-2-methyl-19-nor-androstene.

Example VI

To a mixture of 11.2 ml. of absolute ether and 0.92 g. of magnesium, a mixture of 1.4 ml. of allylbromide and 1.4 ml. of absolute ether is added in nitrogen atmosphere.

Subsequently a solution of 1 g. of Δ⁴-17-keto-2-methyl-19-nor-androstene in 15 ml. of absolute ether is added to this reaction mixture, after which there is stirred for 4 hours. Then the reaction mixture is poured into acidified ice-water. The aqueous mixture is extracted with ether, the ether layer is separated, washed with water, dried over sodium sulphate and evaporated to dryness. The residue is crystallized from a mixture of ether and petroleumether to yield the Δ⁴-2α-methyl-17β-hydroxy-17α-allyl-19-nor-androstene.

By esterification of this compound in the manner described in the above examples the 17-esters thereof are derived from acetic acid, β-phenyl propionic acid and succinic acid.

Example VII

In an analogous manner as described in Example VI the Δ⁴-2-methyl-17-keto-19-nor-androstene is converted into the corresponding 17β-hydroxy-17α-propyl-, 17β-hydroxy-17α-butenyl-, and 17β-hydroxy-17α-propynyl-compounds by reacting the Δ⁴-2-methyl-17-keto-19-nor-androstene respectively with propyl magnesium bromide, butenyl magnesium bromide and propyne gas.

In accordance with the method described in Example I, these compounds are converted into the corresponding 17-esters derived from acetic acid, butyric acid, succinic acid, β-phenyl propionic acid, oenanthic acid, capronic acid and β-chloro propionic acid.

I claim:
1. Steroids of the general formula:

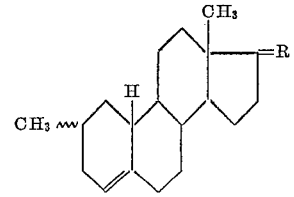

in which R is selected from the group consisting of (H)βOH, H(βOAcyl), O, P(βOH) and P(βOAcyl), in which P is selected from the group consisting of a saturated and unsaturated aliphatic hydrocarbon radical with 1–4 carbon atoms and OAcyl represents a carboxylic acid group.

2. Steroids of the general formula:

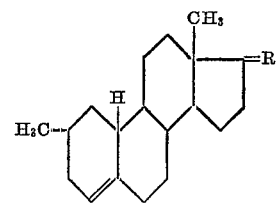

in which R is selected from the group consisting of (H)βOH, H(βOAcyl), O, P(βOH) and P(βOAcyl), in which P is selected from the group consisting of a saturated and unsaturated aliphatic hydrocarbon radical with 1–4 carbon atoms and Acyl represents a carboxylic acid group.

3. A compound selected from the group consisting of Δ⁴ - 2α - methyl - 17β - hydroxy - 17α - ethyl - 19 - nor-androstene and 17-carboxylic acid esters thereof.

References Cited in the file of this patent

UNITED STATES PATENTS 2,878,267  Szpilfogel et al. _____ Mar. 17, 1959

FOREIGN PATENTS 809,485  Great Britain _____ Feb. 25, 1959

OTHER REFERENCES

Ringold et al.: J. Am. Chem. Soc., vol. 80, pages 6115–8 (1958).

Ringold et al.: J. Am. Chem Soc., vol. 81, pages 427–32 (1959).